United States Patent [19]
Makhobey

[11] Patent Number: 5,217,232
[45] Date of Patent: Jun. 8, 1993

[54] THERMALLY REGULATED SEGMENTED SEAL

[75] Inventor: Mark Makhobey, Phoenix, Ariz.

[73] Assignee: Car-Graph, Inc., Tempe, Ariz.

[21] Appl. No.: 875,246

[22] Filed: Apr. 28, 1992

[51] Int. Cl.⁵ ............................................. F16J 15/32
[52] U.S. Cl. ...................................... 277/26; 277/27; 277/136; 277/157
[58] Field of Search ............... 277/26, 27, 157, 136, 277/138, 58, 166, 189

[56] References Cited

U.S. PATENT DOCUMENTS

| | | | |
|---|---|---|---|
| 1,331,522 | 2/1920 | Parsons et al. | 277/157 |
| 2,149,524 | 3/1939 | Hunn | 277/26 |
| 2,917,329 | 12/1959 | Laser | 277/81 |
| 2,937,039 | 5/1960 | Santapa | 277/81 |
| 2,948,555 | 8/1960 | Wright | 277/26 |
| 3,277,797 | 10/1966 | Tyree, Jr. et al. | 277/26 |
| 3,333,855 | 8/1967 | Andresen | 277/40 |
| 4,405,134 | 9/1983 | Sargent | 277/27 |
| 4,722,534 | 2/1988 | Wentworth | 277/28 |
| 5,014,999 | 5/1991 | Makhobey | 277/3 |

FOREIGN PATENT DOCUMENTS 0256066 11/1986 Japan ................................. 277/26
0964316 10/1982 U.S.S.R. ........................... 277/26

Primary Examiner—Thomas B. Will
Assistant Examiner—Daniel G. DePumpo
Attorney, Agent, or Firm—Gregory J. Nelson

[57] ABSTRACT

A segmented seal for a rotating member such as a shaft of a gas turbine engine. The seal includes a housing disposed about the shaft which housing receives a seal member formed from a suitable material such as carbon or ceramic having a bore receiving a shaft defining a shaft interface. The seal is axially restrained within the housing. A thermal control member extends annularly around the shaft and engages a surface of the seal. The thermal control member has a coefficient of expansion greater than that of the seal so that upon heating, the thermal control member will exert a force on the seal to lift the seal from the shaft so that the seal is self-adjusting to accommodate varying operating speeds and temperatures.

10 Claims, 2 Drawing Sheets

THERMALLY REGULATED SEGMENTED SEAL

The present invention relates to mechanical seals and more particularly relates to segmented seals of the type for sealing surfaces between static and rotatable components and devices such as gas turbine engines.

The development of gas turbine engines has placed strong emphasis on the requirement for effective sealing arrangements about rotating shafts. Current sealing technology must address the problems of high speed, high temperature and high pressure while maintaining low leakage rates. Generally in sealing arrangements for such applications, non-contacting seals are utilized in which the sealing surface between the static and rotatable components operate in close proximity to define a clearance space through which a minimum controlled fluid flow is permitted at least during higher speed and temperature operations. These seals are designated as segmented seals and are designed to maintain contact between the seal and the shaft during seal operation. As the pressure differential increases across the seal, the radial load increases on the seal presenting cooling and sealing problems.

A number of seal arrangements for sealing about rotating parts or shafts having particular application to the gas turbine field can be found in the prior art.

U.S. Pat. No. 2,917,329 discloses a cartridge-type rotary seal for preventing leakage of a high temperature gas along a high speed rotary shaft. The patentee suggests the use of a carbon or ceramic material as a rotor material. A retaining ring is placed around the outer surface of the rotor to insure that the rotor is always in compression. The ring prevents destruction of the rotor by the relative greater thermal expansion of the rotating shaft. Grooves may be placed in the inner surface of the rotor to reduce contamination and the possibility of binding.

U.S. Pat. No. 2,937,039 also relates to a controlled gap seal. A carbon sealing ring is compressibly held by an outer metallic ring which is shrink-fitted about the carbon ring. The controlled gap seal structure is provided which incorporates a shaft-like sleeve arrangement for sealing relation with the composite sealing member. The shaft-like sleeve functions as a substitute shaft with the operational temperatures of the sleeve approximating the operational temperatures of the composite sealing ring providing improved gap control.

U.S. Pat. No. 3,333,855 relates to a circumferential seal which floats in a supporting structure to accommodate eccentricities, run-outs and misalignment of the parts to be sealed. Specifically, the patent discloses a circumferential shaft seal having a spring loaded contractible shaft embracing sealing ring carried in a self-centering floating support accommodating shaft run-outs without damage to the ring seal while at the same time dampening the tendency of the ring seal to open up leakage gaps under eccentric shaft action.

U.S. Pat. No. 4,405,134 discloses a non-contacting gas seal between static and rotatable components of a gas turbine engine. A ring seal is composed of a plurality of overlapping segments which cooperate to define a sealing face. The segments are located in a housing preferably on the static component with the sealing face confronting the sealing face on the rotating component of the arrangement so that in operation the segments lift away from the rotating component to ride on a gas film leaving a small clearance.

U.S. Pat. No. 4,722,534 discloses an end face mechanical seal having a pair of seal rings with opposed faces which are urged into sealing relationship to one another to seal a high pressure fluid.

My prior patent, U.S. Pat. No. 5,014,999 discloses a self-aligning ring seal for rotating members such as the shaft of a gas turbine relative to the housing. The ring seal includes a housing retaining a static, resilient seal. A seal plate engages the resilient seal and the seal plate has a curved peripheral edge which permits movement of the seal plate relative to the housing. An annular ring seal assembly extends about the shaft preferably made of carbon or other temperature-resistant material held in compression by an outer compression ring. The seal assembly has a sealing face engaging the seal plate. In the event of misalignment, the sealing faces on the seal plate and seal assembly remain in substantially full sealing contact with the misalignment being translated to the static seal.

The above are representative of various configurations that can be found in the prior art.

Briefly, the present invention provides an improved segmented seal which initially operates in the manner similar to a typical segmented seal maintaining near zero shaft clearance at low speeds. At increased speeds, heat generated in the operation due to friction between the shaft and the seal is transferred to an annularly extending thermal control ring. The control ring has a high coefficient of expansion relative to the segmented seal and is in engagement with the seal which may be carbon or ceramic. As the thermal control ring expands radially, it applies a radially outward force on the seal reducing the contact load of the seal against the shaft thus reducing the heat generation within the seal. A stable point of operation is reached quickly and the seal itself adjusting to accommodate varying operating speeds and temperatures.

Unlike conventional segmented seals, an increase in pressure does not increase the radial loads on the interface between the segmented seal and the shaft and therefore the heat generation is not directly affected by an increase in air pressure.

The above and other objects and advantages of the present invention will be more fully appreciated from the following description, claims taken in conjunction with the drawings in which:

Figure 1:
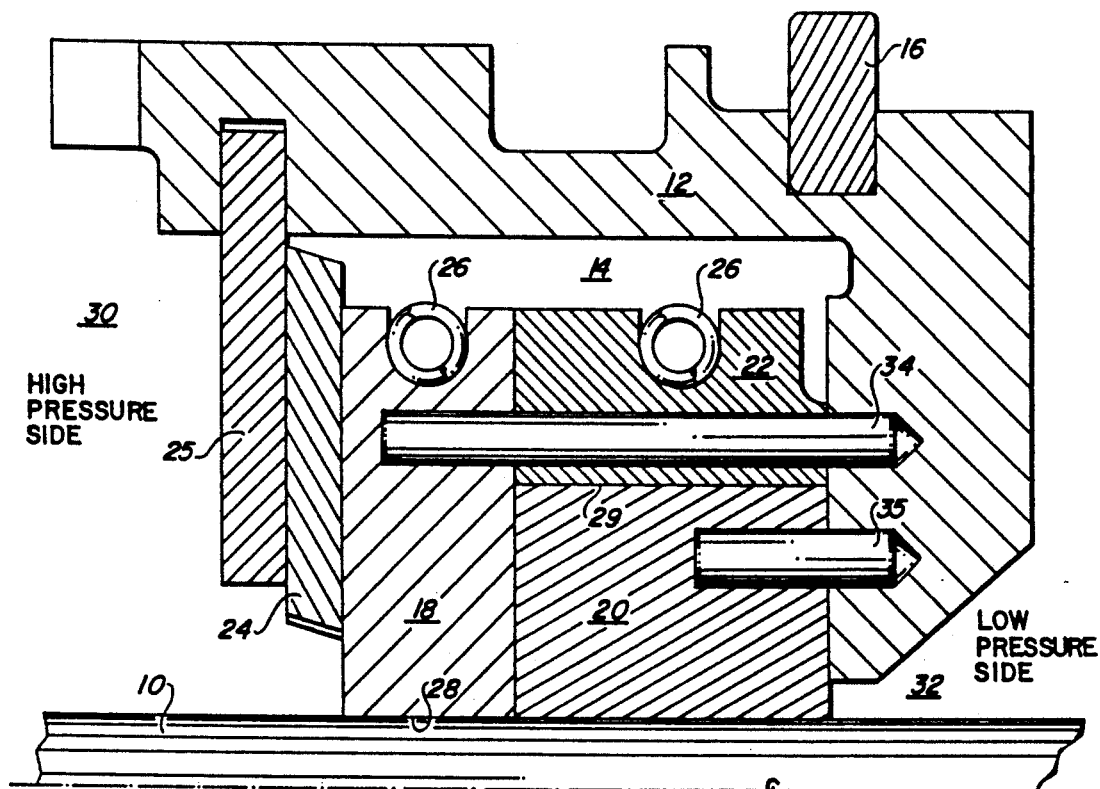
FIG. 1 is a cross-sectional view of a typical prior art segmented shaft seal.

Referring now to the drawings, FIG. 1 is representative of a typical segmented seal assembly shown in conjunction with a rotating shaft 10. The seal is a non-rotating seal having a housing 12 defining an annular seal cavity 14. The housing is held in place by a snap ring 16. The cavity 14 extends annularly around shaft 10 and, as shown, houses a plurality of sealing members 18, 20 and 22 which are axially held in position by wave spring 24 interposed between seal member 18 and end plate 25. The sealing members are annularly restrained by garter springs 26.

The seal members 18 and 20 are annular and each define a bore 28 which closely fits about the outer diameter of the shaft 10. The seals are restrained by anti-rotation pins 34 and 35. The seal members are formed from a suitable material such as a carbon or ceramic material capable of withstanding high speeds and high temperature operating conditions over an extended period of time. Seal 20 may be segmented to accommodate wear. Annular seal 22 seals radially about the periphery of seal 20. Seal 18 seals both at the interface with the shaft and at the axial interface 29 between seals 20 and 22.

Carbon and high temperature ceramic materials are generally nonflexible and exhibit a fairly low rate of thermal expansion in response to changing temperature conditions. As a result, seals of circumferentially continuous form and made of carbon and ceramic expand at a slower rate than the expansion rate of the shaft 10 in response to increasing operational temperatures. Accordingly, under these operating conditions a carbon ring seal may generate excessive heat and wear both on the seal and the shaft.

One significant problem with conventional segmented seals as represented by FIG. 1 is that they are designed to maintain shaft contact or close contact during seal operation and as the air pressure differential between the high pressure area 30 and lower pressure area 32 increases across the seal, the radial load on the seal increases which in turn increases the heat generation at the shaft and seal interface. To counteract this condition, elaborate cooling systems which require large volumes of cooling fluid are necessary at high pressure and high speeds to maintain a safe level of operation.

Figure 2:
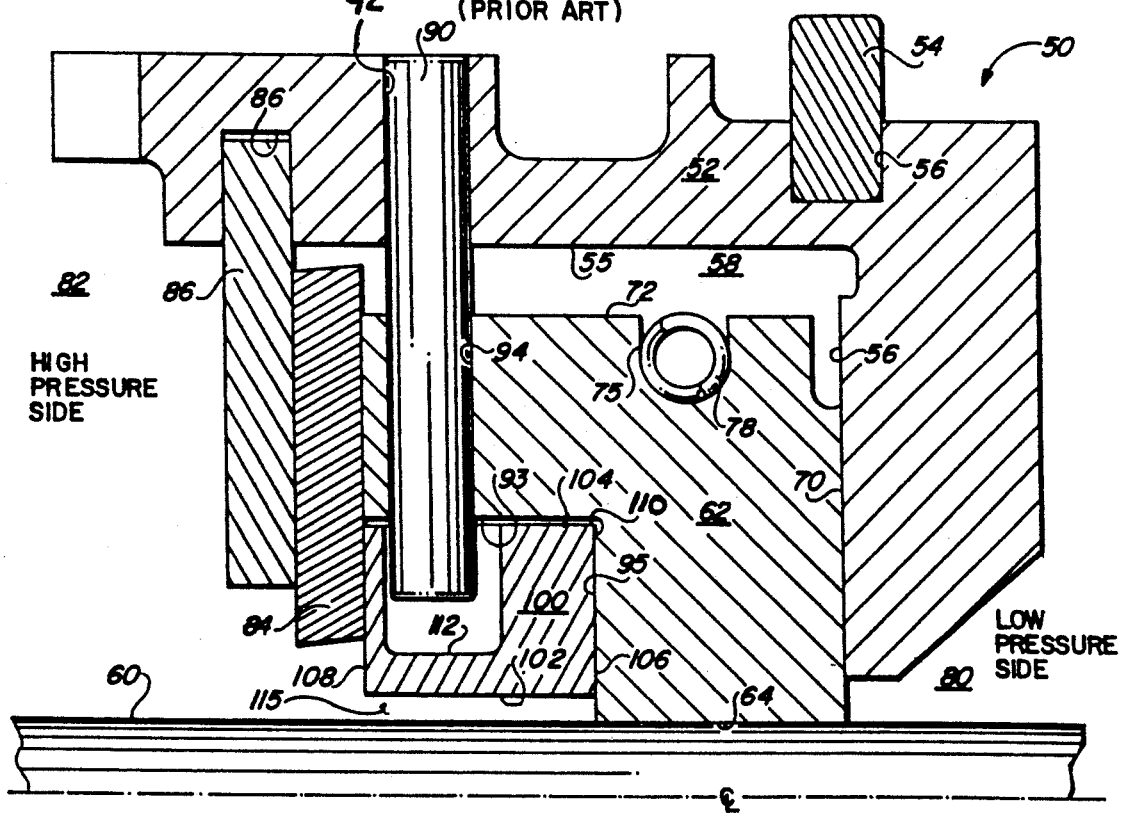
FIG. 2 is a cross-sectional view of the improved segmented thermally responsive seal of the present invention.

The present invention represents a substantial improvement over prior art segmented seals as shown in FIG. 1. A preferred embodiment of the thermally controlled seal of the present invention is shown in FIG. 2. The new segmented thermally responsive seal initially operates in a manner similar to a conventional segmented seal as shown in FIG. 1 maintaining sealing contact with the shaft at lower speeds. The improved seal utilizes the heat that is generated as a result of friction between the sealing arrangement and the shaft to cause thermal expansion of a control ring having a high coefficient of expansion to regulate the position of the seal. As the radial growth increases, the thermal control ring reduces the contact load of the seal against the shaft and thus reduces heat generation within the seal.

As seen in FIG. 2, the improved seal assembly is generally designated by the numeral 50 and includes and exterior housing 52. The housing 52 is stationary and is secured in place by annular ring 54 which engages an annular recess 56 in the housing. The housing extends annularly about shaft 60 which is a rotating member. The housing 52 has a generally axially extending surface 55 and a radially extending surface 56 which defines a seal cavity 58 about the shaft 60. Annular seal member 62 is received within the cavity 58 and defines a bore 64 through which axial shaft 60 extends. In operation, heat is generated as a result of friction at the interface between the bore in the seal and the shaft. The seal member is formed from a suitable material such as carbon or ceramic capable of withstanding high speeds and high temperature conditions over extended periods of operation. Carbon and other high temperature materials are generally nonflexible and exhibit a fairly low rate of thermal expansion in response to changing temperature conditions. As a result, seals of circumferential form made from carbon or ceramic expand at a slower rate than the rate of expansion of the shaft in response to increasing temperatures. Under these conditions, carbon ring will generate excessive heat and wear unless provision is made for increased cooling at increased loads. The seal 62 has a radially extending face 70 which engages the radially extending face 56 of the housing. The seal extends radially to a surface 72 spaced apart from the axial surface 55 of the housing. A recess or annular groove 75 is provided in the outer surface of the seal and receives a compressive member 78 which is shown as a garter spring which maintains the ring in compression. The seal is shown as a substantially continuous annulus which may be segmented, as for example, consisting of three 120° segments.

The low pressure side of the bearing assembly is designated by the numeral 80 and an oil/air mist is maintained in this area. The opposite side of the assembly is designated by the numeral 82 and is the high pressure air side in conventional turbine installations. The seal assembly is held in place by a retainer or end plate 85 extending from a groove or recess 86 in the housing. A suitable biasing member shown as an annular wave spring 84 is interposed between the retainer and the radial surface of the seal at the high pressure side of the seal. Anti-rotation pin 90 extends radially through a bore 92 in the housing and an aligned bore 94 in the seal. The seal is undercut defining a recess having an axial surface 93 and radial surface 95.

The thermal control element 100, shown in the form of a generally annular ring having a central bore 102, outer annular surface 104 and opposed radial faces 106 and 108. Radial face 106 abuts or engages radial surface 95 of the seal. Surface 104 of the thermal control ring is spaced apart from the seal so that a small clearance gap 110 is maintained between thermal control ring and the surface 104 of the seal under nonoperating or low friction conditions. Typically this gap would be in the range of 0.001-0.000 inches. It will be noted that anti-rotation pin 90 depends into a recess 112 in the thermal control ring to restrain the thermal control ring against rotation. The end surface 108 of the thermal control is engaged by wave spring 84 and is axially restrained by the spring.

A clearance space or gap 115 is also maintained between the bore 102 of the thermal control ring and the outer diameter of the shaft. Typically, this clearance is sufficient so that under full range of operating conditions, physical contact between the bore and the thermal control ring is avoided.

The material of the thermal control ring 100 is selected so as to have a high coefficient of expansion, that is, substantially higher than the coefficient of expansion of the seal element or segment 62. A representative material for the control ring is 300 Series stainless steel which has a high coefficient of expansion which is greater than that of the shaft 60 which typically is 400 SST.

In operation, as the shaft 60 begins to rotate, heat will be generated at the interface between the shaft and the bore 64 in the seal. As the temperature increases as the shaft operates, heat will be transmitted to the thermal control element 100. The thermal control element will, in turn, increase in temperature and as a result of its high thermal expansion, will radially expand. As thermal control element 100 radially expands, surface 104 of the thermal control element will engage surface 93 of the seal causing the seal to lift away from the shaft at bore 64. As the thermal control elements expand, the load between the seal and the shaft will also decrease, reducing the heat generation. Once the thermal control ring engages the control surface 104 of the seal, external air pressure ceases to have any effect on the radial loading of the seal. Thus, the seal assembly becomes independent of the high pressure existing in the area 82. As a result, pressure balancing of the segmented seal 62 is not required and the heat generated by the seal is reduced.

In operation, a stable point or point of equilibrium is reached quickly and the seal assembly adjusts in response to various operating conditions, speeds and temperatures. Unlike the standard segmented seal of FIG. 1, increase in pressure at the high pressure side 82 does not increase the radial load on the interface between the seal and the shaft.

Figure 3:
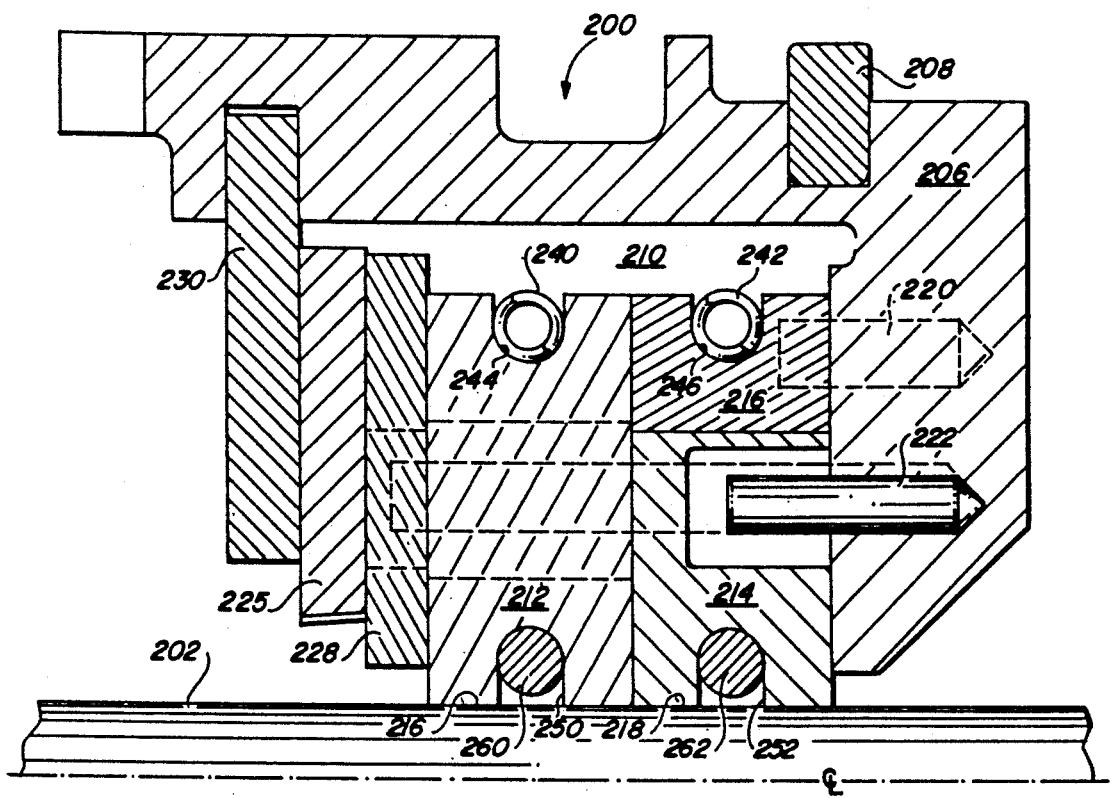
FIGS. 3 and 4 are cross-sectional view of alternate embodiments of the present invention.

FIG. 3 illustrates another embodiment of the present invention which utilizes a thermal control ring to maintain a controlled clearance between multiple seal elements and the rotating shaft. In FIG. 3, the seal embodiment is generally designated by the numeral 200 and again includes a rotating shaft 202. The seal assembly includes a housing 206 which is secured in place by a retaining ring 208. The housing 206 defines an annular chamber or cavity 210 which extends about the shaft. Within the cavity 210 are shown a plurality of seal members 212, 214 and 216. The seal members may be of a suitable material such as carbon or ceramic. Seal member 214 has a bore 216 through which shaft 202 extends. Similarly, seal member 212 has a bore 218 through which shaft 202 extends.

Seal 214 may be segmented. Seal 216 seals the interface between the segments of seal 214 and seal 212 seals at the radial surfaces of seals 214 and 216. As has been explained in detail above, under operating conditions, substantial heat may be generated at the surfaces 216 and 218. The seal members 212 and 214 are restrained against movement by suitable anti-rotation pins 220 and 222. The seal members 212, 214 and 216 are axially held in place by a wave washer 225 interposed between annular washer 228 and retainer 230. The seal members 212 and 214 are compressibly retained by annularly extending garter springs 240 and 242 which are received within respective recesses 244 and 246.

The thermal control elements are disposed about the shaft 202. Seal 212 has an annularly extending recess 250 which intercepts surface 216. Similarly, surface 218 in seal member 214 is intercepted by annularly extending recess 252. Recess 250 receives a thermal control member 260 which is shown as an annulus of steel wire having high coefficient of expansion which coefficient of expansion is greater than the coefficient of expansion of the associated seal. The recess size and diameter of the thermal control member 260 are selected so that a sufficient clearance exists at all times between the exterior surface of shaft 202 and the thermal member 260. Thermal control member 262 is similar to member 260.

In operation, as heating occurs, the thermal control member will expand at a rate greater than the associated seal. The radial growth or expansion of the thermal control element applies a radial force to the seal causing the seal element or elements to lift away from the shaft. As with previous embodiments, a point of operational equilibrium is reached and the thermal control element will be self-adjusting in accordance with varying operating conditions.

Figure 4:
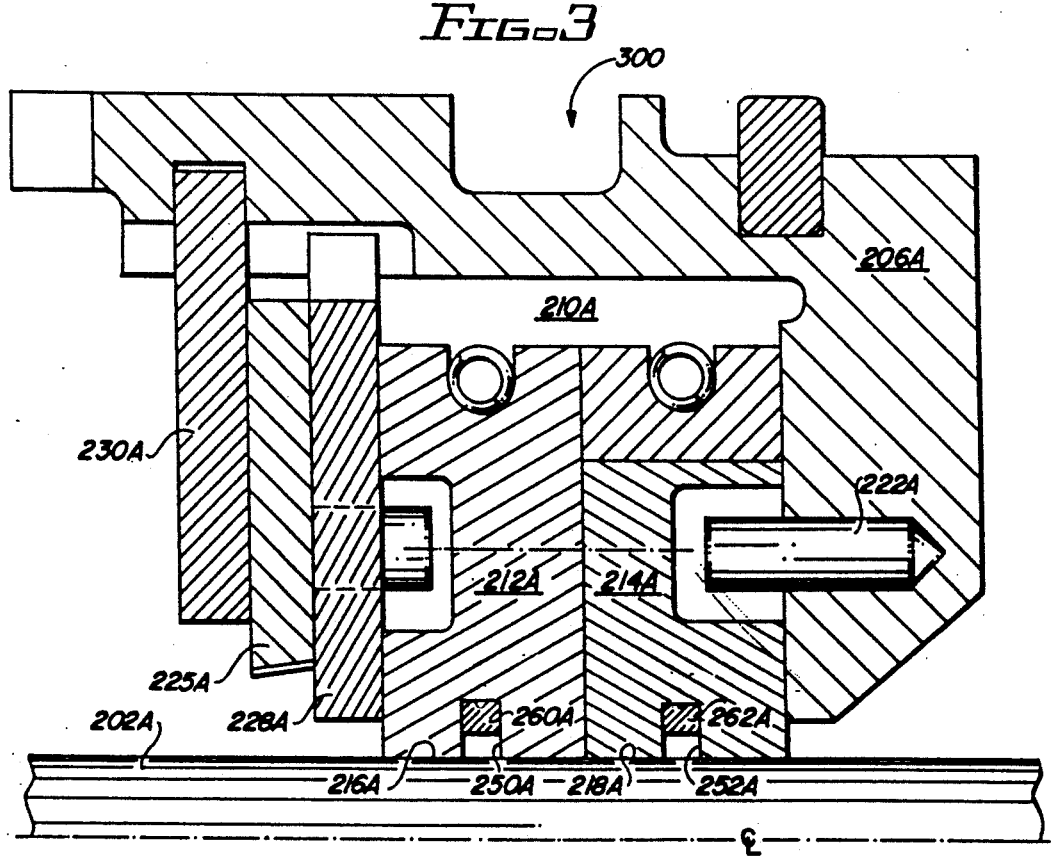

The embodiment of FIG. 4 is generally designated by the numeral 300 and is constructionally similar to embodiment 200 of FIG. 3. For convenience, similar elements or components have been designated with the same numerals used with respect to FIG. 3 but with an "A" appended. Thus, in FIG. 4, housing 206A is disposed about rotating shaft member 202A. Housing 206A defines a cavity 210A which receives annular seal members 212A and 214A. The seal members are disposed against rotation by anti-rotation pin 222A and are axially restrained by wave washer 225A interposed between annular washer 228A and retainer or end member 230A.

Each of the seal members define a bore at 216A and 218A, respectively, which contacts the shaft to maintain a sealing relationship with respect to the shaft. A recess 250A having a generally rectangular cross section extends annularly in seal member 212A and intercepts bore 216A. A similarly configured annularly extending groove or recess 252A is provided in bore 218A.

In the embodiment of FIG. 4, the thermal control members 260A and 262A are shown as having a generally rectangular cross-section and may be solid or split rings. A split ring extends entirely annularly about the shaft and is split at a location to facilitate separation for installation. The material of the thermal control elements 260A and 262A is selected to have a coefficient of expansion higher than that of the associated seal. In operation, the thermal control rings operate as has been described above with reference to FIGS. 2 and 3 and the overall construction of the seal assembly is otherwise similar to FIG. 3.

Basically, the present invention defines a seal in which the sealing member contacting the rotating shaft is associated with a thermal control element. The thermal control element is selected having a predetermined coefficient of expansion and is positioned to engage a surface of the seal so that upon heating of the thermal control element, a force is applied to the seal that will cause the seal to lift away from the shaft. In the preferred embodiments, the thermal control member is a steel member and in contacts the seal and is also directly exposed to the shaft so that heating occurs by conduction as well as by means of radiation and convection. In some instances the thermal control element may be embedded within the seal material. For example, the seal may be a molded ceramic with the thermal member encased in the material at or adjacent the shaft bore.

It will be seen that the present invention provides an improved mechanical seal which has the advantages set forth above. The seal of the present invention provides substantial structural and functional advantages over prior art seals as has been described.

As indicated above, an important feature is that the thermal control ring is self-adjusting and independent of the pressure loading on the axially sealing surface.

While the invention has been described in connection with several specific embodiments, it will be obvious to those skilled in the art that various changes, modifications and variations can be made to the invention in view of the foregoing description without departing from the spirit and scope of the appended claims.

I claim:
1. A self-adjusting mechanical seal for sealing fluid flow along an axially extending rotatable shaft, said seal comprising:
  (a) a housing member extending circumferentially about said shaft and defining a sealing area;
  (b) a seal member disposed in said sealing area extending annularly about said rotatable shaft at a seal bore, said seal member having a first rate of thermal expansion and contacting the shaft to maintain a seal at shaft start-up;

(c) means for retaining said seal in said sealing area; and (d) a thermal control member extending annularly about said shaft and spaced therefrom, said thermal control member having a second rate of thermal expansion which is greater than said first rate of thermal expansion, said thermal control member engaging said seal member whereby heat at the seal bore will cause said thermal control member to radially expand to lift the seal bore away from the shaft reducing the contact load of the seal against the shaft.

2. The seal of claim 1 wherein said seal is carbon and is held in place by an outer compression member.

3. The seal of claim 1 wherein said seal defines a generally annularly extending groove at said bore and wherein said thermal control member is disposed in said groove.

4. The seal of claim 1 wherein said seal is carbon and wherein said thermal control member is steel.

5. The seal of claim 1 wherein said seal defines an annularly extending recess at the bore and wherein said thermal control member extends annularly within said annular recess.

6. The seal of claim 5 wherein said thermal control member comprises an annular member having a generally circular cross section.

7. The seal of claim 5 wherein said seal defines a recess intercepting said bore and wherein said thermal control member comprises an annularly extending member having a generally rectangular cross section located in said recess.

8. The seal of claim 7 wherein said annularly extending ring is split.

9. The seal of claim 1 wherein said seal member comprises a plurality of seal members axially located along the shaft.

10. The seal of claim 9 wherein at least one of said plurality of seals is segmented.

* * * * *